United States Patent
Okamoto et al.

(10) Patent No.: US 10,632,579 B2
(45) Date of Patent: Apr. 28, 2020

(54) ASSEMBLY DEVICE OF BALL SCREW AND ASSEMBLY METHOD OF BALL SCREW

(71) Applicant: NTN CORPORATION, Osaka (JP)

(72) Inventors: Jyunichi Okamoto, Shizuoka (JP); Shinji Yoshinaga, Shizuoka (JP); Yukihiro Terada, Shizuoka (JP)

(73) Assignee: NTN CORPORATION, Osaka (JP)

( * ) Notice: Subject to any disclaimer, the term of this patent is extended or adjusted under 35 U.S.C. 154(b) by 241 days.

(21) Appl. No.: 15/764,996

(22) PCT Filed: Sep. 2, 2016

(86) PCT No.: PCT/JP2016/075914
§ 371 (c)(1),
(2) Date: Mar. 30, 2018

(87) PCT Pub. No.: WO2017/056853
PCT Pub. Date: Apr. 6, 2017

(65) Prior Publication Data
US 2018/0281133 A1    Oct. 4, 2018

(30) Foreign Application Priority Data

Oct. 1, 2015  (JP) ................. 2015-195958

(51) Int. Cl.
*B23P 21/00* (2006.01)
*F16H 25/24* (2006.01)
(Continued)

(52) U.S. Cl.
CPC .......... *B23P 21/00* (2013.01); *F16H 25/2204* (2013.01); *F16H 25/24* (2013.01); *F16H 57/00* (2013.01); *F16H 25/2223* (2013.01); *F16H 2025/2481* (2013.01); *F16H 2057/0062* (2013.01)

(58) Field of Classification Search
CPC ...... B23P 21/00; F16H 25/24; F16H 25/2204; F16H 25/2223; F16H 2025/2481; F16H 2057/0062; F16H 57/00
See application file for complete search history.

(56) References Cited

U.S. PATENT DOCUMENTS

| 7,946,018 | B2* | 5/2011 | Tokura | ................. | B23P 19/001 29/429 |
| 2006/0112561 | A1* | 6/2006 | Chiba | ................. | B23P 19/001 29/898.04 |
| 2007/0137349 | A1* | 6/2007 | Tokura | ................. | B23P 19/001 74/424.86 |

FOREIGN PATENT DOCUMENTS

JP    2009-262240    11/2009

OTHER PUBLICATIONS

International Search Report issued in International (PCT) Application No. PCT/JP2016/075914 dated Nov. 22, 2016.
(Continued)

*Primary Examiner* — Bayan Salone
(74) *Attorney, Agent, or Firm* — Wenderoth, Lind & Ponack, L.L.P.

(57) ABSTRACT

According to the present invention, a nut is in a state of being received by nut receiving means. In this state, a ball-embedding nozzle is fitted into the nut so that a gap between the inner circumference of the nut and the outer circumference of the ball-embedding nozzle is uniformly formed around the entire circumference thereof. Balls are supplied into a screw groove of the nut via a ball supply path in the ball-embedding nozzle.

11 Claims, 11 Drawing Sheets

(51) Int. Cl.
*F16H 25/22* (2006.01)
*F16H 57/00* (2012.01)

(56) References Cited

OTHER PUBLICATIONS

International Preliminary Report on Patentability and Written Opinion of the International Searching Authority issued in International (PCT) Application No. PCT/JP2016/075914 dated Apr. 3, 2018.

\* cited by examiner

ASSEMBLY DEVICE OF BALL SCREW AND ASSEMBLY METHOD OF BALL SCREW

TECHNICAL FIELD

The present invention relates to an assembly device of a ball screw and an assembly method of the ball screw.

BACKGROUND ART

A ball screw is a mechanical element that converts rotational motion of a motor or the like into linear motion and is used for conveying, positioning, or the like of a semiconductor manufacturing device, an industrial robot, or a machine tool. Types of the ball screw include a tube type, an end-cap type, a deflector type, and the like.

In the tube type ball screw, a tube is bent into a U shape so as to serve as a circulation portion and is attached to a nut. After a ball that passed through the tube travels in one and a half round, two and half rounds, or three and half rounds of a screw groove, the ball again passes through the tube. Thus, one ball circulation circuit is constituted. In addition, in the end-cap type ball screw, circulation parts are attached to both ends of a nut. A through hole is provided in a nut body for allowing a ball to go back and forth. In the deflector type ball screw, a ball rolling between a screw shaft and a nut is circulated by a deflector (internal deflector) embedded in the nut, and a circulation circuit is formed in each lead.

Figure 14A:
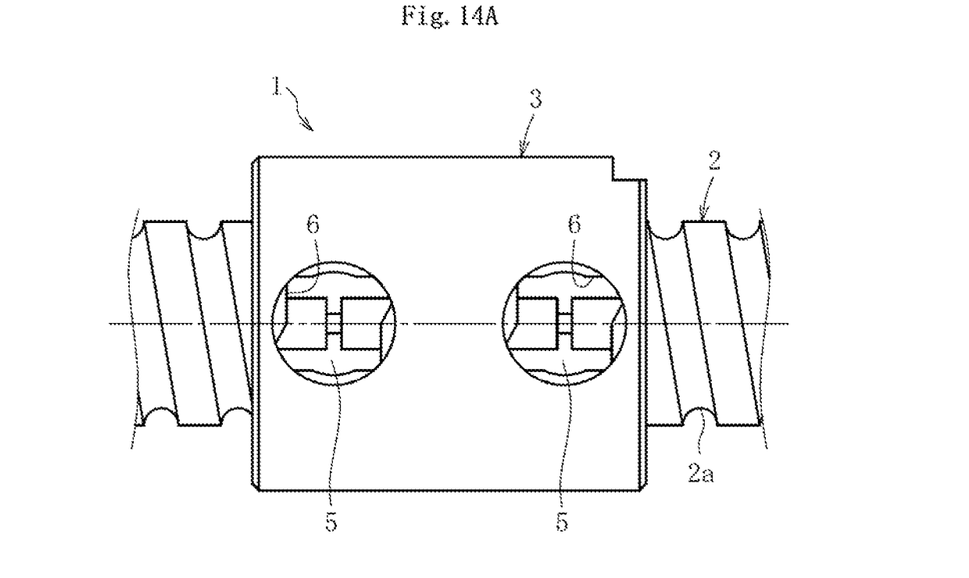
FIG. 14A is a plan view of the internal deflector-type ball screw.
Figure 14B:
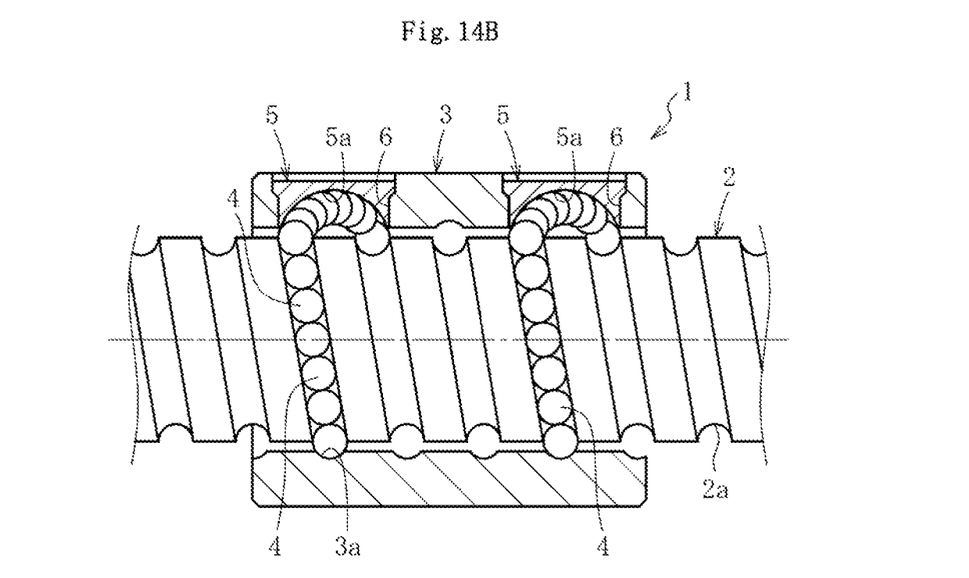
FIG. 14B is a cross-sectional view of the internal deflector-type ball screw.

FIGS. 14A and 14B illustrate a conventional deflector (an internal deflector type ball screw). This ball screw 1 includes a screw shaft 2 having a spiral screw groove 2a formed in an outer peripheral surface of the screw shaft 2, a nut 3 which is fitted over the screw shaft 2 and having a spiral screw groove 3a formed in an inner peripheral surface of the nut 3, a large number of balls 4 which are accommodated in a rolling path formed of the screw grooves 2a, 3a facing each other, and an internal-deflector member 5 which serves as a member for circulating these balls 4.

In a barrel portion of the nut 3 having a cylindrical shape, two internal-deflector windows 6 each having a substantially circular cross section are formed side by side so as to penetrate through the inner and outer peripheral surfaces of the barrel portion and to cut out part of the screw groove 3a. The internal-deflector member 5 serving as a member for circulating the balls 4 is fitted in each internal-deflector window 6.

On the inner side of the internal-deflector member 5, a connecting groove 5a for connecting adjacent rounds of the screw groove 3a to each other is formed. As a result, the connecting groove 5a and a portion of the screw groove 3a which constitute an approximately one round allow the ball 4 to orbit. That is, the rolling path formed of the screw grooves 2a, 3a facing each other is an orbiting path (circulation line). The large number of balls 4 interposed between the inner and outer screw grooves 2a, 3a inside the rolling path roll along the screw grooves 2a, 3a, are guided to the connecting groove 5a of the internal-deflector member 5, pass over a screw thread of the screw shaft 2, return to the adjacent screw groove 3a, and rolls again along the screw grooves 2a, 3a.

The connecting groove 5a of the internal-deflector member 5 is curved in an S shape so as to smoothly connect the adjacent screw grooves 3a, 3a of the nut 3, and is smoothly connected to the screw groove 3a. In addition, the depth of the connecting groove 5a is set to a depth such that the ball 4 can pass over the screw thread of the screw groove 2a in the screw shaft 2 in the connecting groove 5a.

Figure 9:
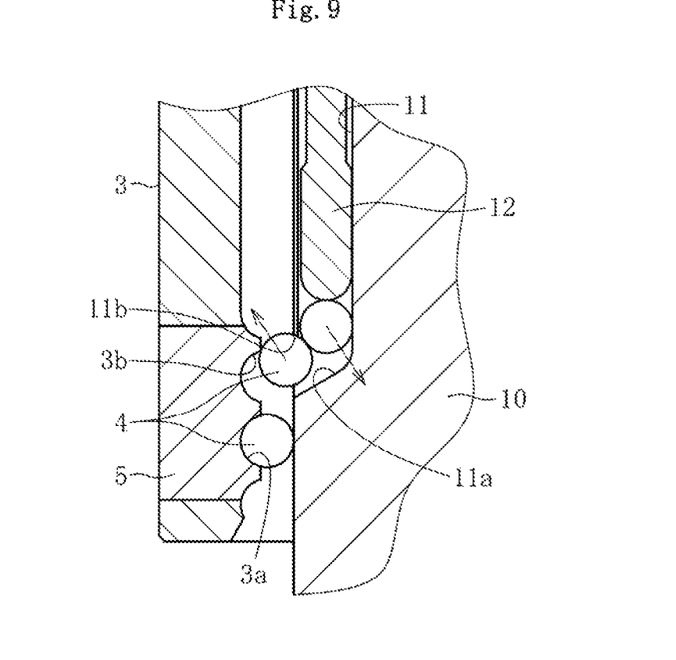
FIG. 9 is a cross-sectional view of a main part of a conventional assembly device of a ball screw.

In an assembly device of such a ball screw, as illustrated in FIG. 9, the internal-deflector member 5 is previously fixed to or integrally molded with the nut 3, a ball guide 10 is inserted in the nut 3, and a predetermined number of balls 4 are supplied from the ball guide 10 toward the screw groove 3a on the inner surface of the nut 3 (supplied into the connecting groove 5a of the internal-deflector member 5 in FIG. 9). The ball guide 10 is provided with a ball supply path 11 having a diameter substantially equal to the bottom diameter of the screw groove 2a of the screw shaft 2 and having as many circulation lines as the circulation lines of the screw groove 2a. An outlet 11a of the ball supply path 11 is set at the highest position of a raceway groove of the nut 3 forming a corresponding circulation line. The ball guide 10 aligns a predetermined number of balls 4 and consecutively supplies the balls 4 to the respective ball supply paths 11. A ball pusher 12 pushes the ball 4 that has not entered the circulation line raceway due to its own weight, and thus the nut 3 is filled with the balls 4.

In the case of the above conventional art, the ball 4 which has not entered the circulation line raceway due to its own weight is pushed by the ball pusher 12 to fill the ball 4 into the nut 3. However, when the ball 4 is filled by pushing the ball pusher 12, the ball 4 near the outlet 11a of the ball supply path 11 is pushed upward of the outlet 11a, and thus the ball 4 is stuck in a small space between an outlet upper edge 11b of the ball guide 10 and a screw inner circumference 3b (an inner circumference of the internal-deflector member 5 in FIG. 9) of the nut 3. Therefore, there is a possibility that assembly failure will occur.

Figure 10:
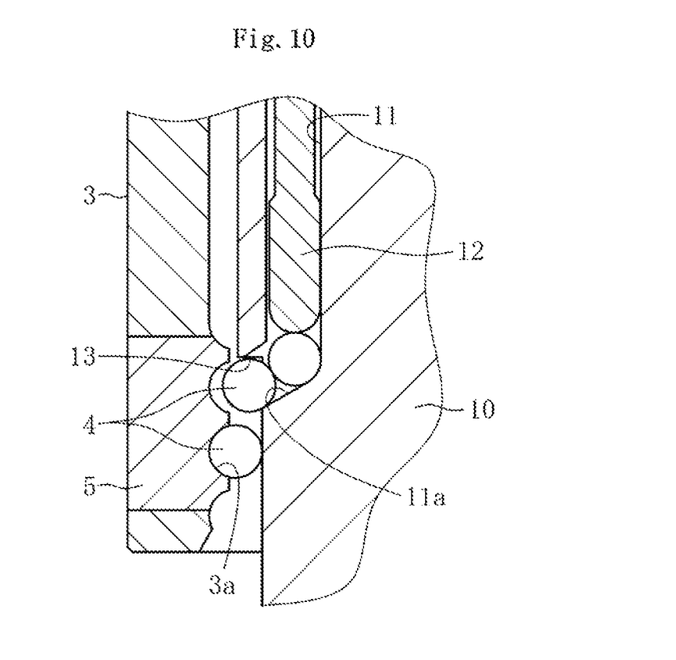
FIG. 10 is a cross-sectional view of a main part of another conventional assembly device of a ball screw.

Therefore, Patent Literature 1, which solves the above-described problem, discloses an assembly device of a ball screw including a stepped portion 13 which projects toward a nut inner circumferential side and is provided at an outlet upper edge portion of a ball supply path 11 of a ball guide 10, as illustrated in FIG. 10. By adopting such a configuration, it is possible to prevent a ball 4 from being stuck in the gap between the ball guide 10 and the nut inner circumferential side, and stable ball assembly is enabled.

CITATION LIST

Patent Literature

Patent Literature 1: JP 2009-262240 A

SUMMARY OF THE INVENTION

Technical Problems

Figure 11:
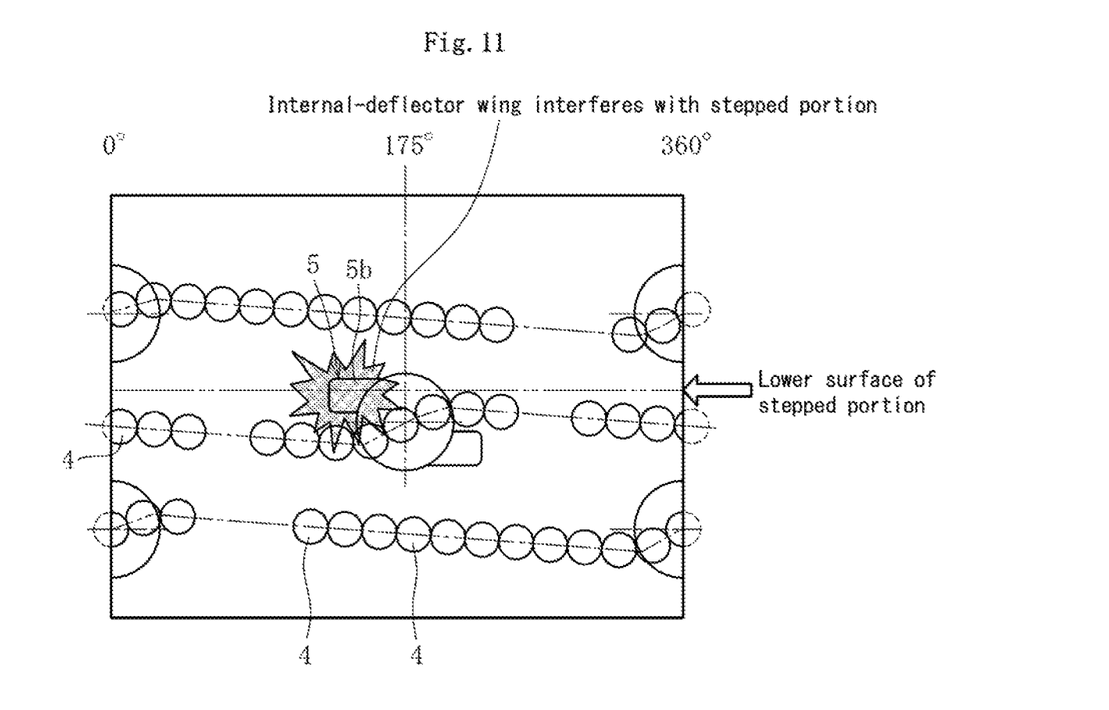
FIG. 11 is a development view explaining the problem of the assembly device of the ball screw illustrated in FIG. 10.
Figure 12A:
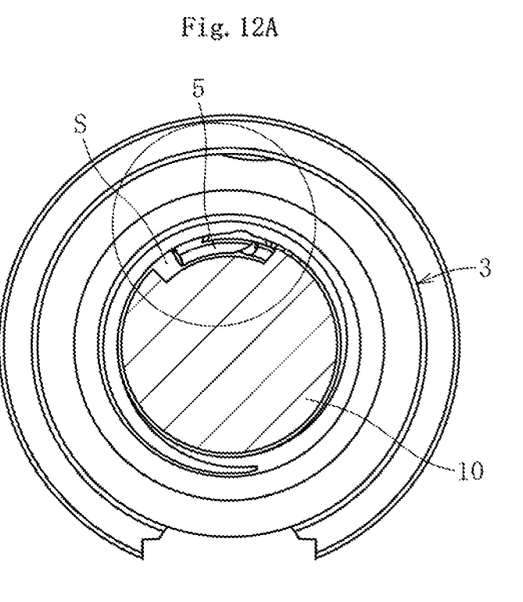
FIG. 12A is a plan view illustrating a relationship among a nut, an internal-deflector member, and a ball-embedding nozzle of the conventional assembly device of the ball screw.
Figure 12B:
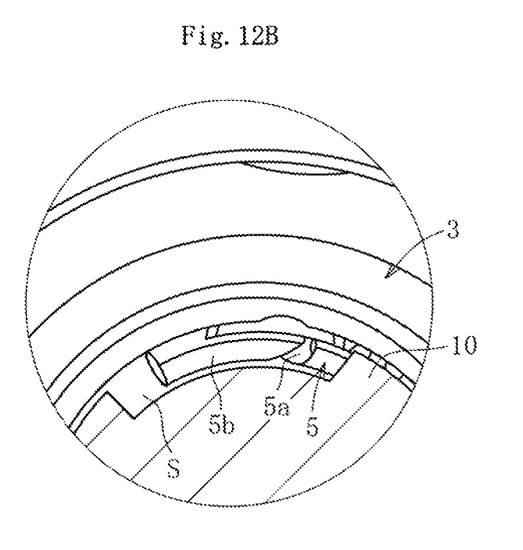
FIG. 12B is an enlarged view of a main part illustrating a relationship among the nut, the internal-deflector member, and the ball-embedding nozzle of the conventional assembly device of the ball screw.
Figure 13A:
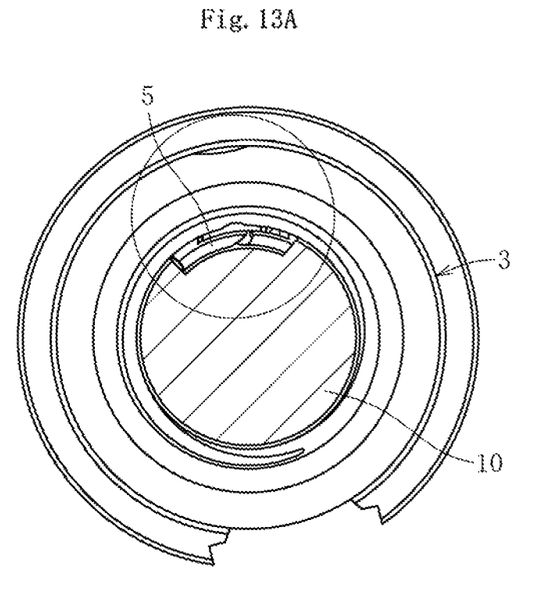
FIG. 13A is a plan view illustrating the relationship among the nut, the internal-deflector member, and the ball-embedding nozzle of the conventional assembly device of the ball screw, in a state where the internal-deflector member matches a gap between the ball-embedding nozzle and the nut.
Figure 13B:
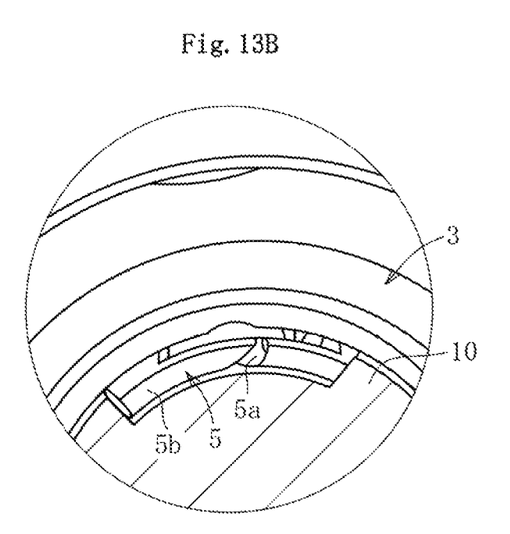
FIG. 13B is an enlarged view of a main part illustrating the relationship among the nut, the internal-deflector member, and the ball-embedding nozzle of the conventional assembly device of the ball screw.

In the assembly device of a ball screw described in Patent Literature 1, when the ball 4 is assembled to the nut 3, the ball 4 turns (swings) about the axis of the nut 3. Therefore, as illustrated in FIG. 11, the stepped portion 13, the wing 5b of the internal-deflector member 5 (see FIG. 12B) interfere with one another. Therefore, as illustrated in FIGS. 12A and 12B, it is necessary to provide a gap S in order to prevent the wing 5b of the internal-deflector member 5 and the ball guide 10 from interfering with each other. That is, by providing such a gap S, as illustrated in FIGS. 13A and 13B, interference does not occur when the nut swings.

However, if the gap S as illustrated in FIGS. 12A and 12B is provided, the ball 4 may be fitted into this gap S. If the ball 4 is fitted as described above, swing motion of the nut 3 may be hindered or the ball 4 may be supplied into a location other than the circulation line.

Therefore, the present invention provides an assembly device of a ball screw and an assembly method of the ball screw capable of making a gap formed between an inner circumference of a nut and an outer circumference of a ball-embedding nozzle small to prevent fitting in of a ball and of maintaining the gap between the inner circumference of the nut and the outer circumference of the ball-embedding nozzle uniform around the entire circumference, and thus enabling stable ball assembly.

Solution to Problems

An assembly device of a ball screw according to the present invention includes: a screw shaft having a spiral screw groove formed in an outer peripheral surface of the screw shaft; a nut which is fitted over the screw shaft and having a spiral screw groove formed in an inner peripheral surface of the nut; a plurality of balls which is accommodated in a rolling path formed of the screw grooves facing each other; and an internal-deflector member which serves as a member for circulating the plurality of balls. The assembly device includes: nut receiving means which receives the nut and rotates the nut about an axis of the nut; a ball-embedding nozzle which has a ball supply path; a ball pusher which is inserted into the ball supply path and pushes the plurality of balls supplied into the ball supply path into the screw groove of the nut; and a ball falling prevention member which is fitted into the nut from a lower opening of the nut to prevent falling of the plurality of balls supplied into the nut. A spiral screw groove identical to the screw groove of the screw shaft is provided in the outer circumferential surface of the ball-embedding nozzle.

According to the assembly device of the ball screw of the present invention, since the spiral screw groove identical to the screw groove of the screw shaft is provided in the outer circumferential surface of the ball-embedding nozzle, it is possible to form a uniform gap between the inner circumference of the nut and the outer circumference of the ball-embedding nozzle over the entire circumference in the circumferential direction. Moreover, the gap can be set to have the minimum dimensions that allow the balls to be supplied into the screw groove of the nut. Also, the ball pusher can push out the balls.

The ball supply path is configured of a linear portion which is disposed along the axial direction of the ball-embedding nozzle, and an inclined portion which is connected to a lower end of the linear portion and is inclined at a predetermined angle with respect to the linear portion. A lower end opening of the inclined portion may serve as a ball supply port to the screw groove of the nut. As described above, if the ball supply path is configured of the linear portion and the inclined portion, the ball can be supplied into the screw groove of the nut obliquely from above, and the ball can be stably pushed out by the ball pusher.

The nut receiving means may include a base which holds the nut, and a rotation driving mechanism which rotates the base about an axis of the base. Such nut receiving means can stably rotate the nut about the axis of the base.

Each of the nut receiving means and the ball falling prevention member can be set so as to be able to move up and down. By setting as described above, assuming that the state where the nut receiving means and the ball falling prevention member are disposed below the ball-embedding nozzle is an initial state, the ball-embedding nozzle can be fitted into the nut received by the nut receiving means from above and the ball falling prevention member can be fitted into the nut from below by lifting the nut receiving means and the ball falling prevention member. In addition, by further lifting the nut receiving means while rotating the nut about the axis of the nut in a state where the ball-embedding nozzle is fitted into the nut from above, it is possible to make the lower opening of the ball supply port match the screw groove of the nut. In addition, a ball receiving portion, that is, the upper end portion, of the ball falling prevention member can be brought close to the screw groove to which the ball is supplied.

An assembly method of a ball screw according to the present invention is an assembly method of a ball screw using the assembly device of the ball screw. The method includes: fitting the ball-embedding nozzle into the nut such that a gap which is uniform over an entire circumference is formed between the inner circumference of the nut and the outer circumference of the ball-embedding nozzle in a state where the nut is received by the nut receiving means and a wing of the internal-deflector member is fitted in the screw groove in the outer circumferential surface of the ball-embedding nozzle; and supplying the balls to the screw groove of the nut via the ball supply path of the ball-embedding nozzle.

According to the assembly method of the ball screw of the present invention, it is possible to form a uniform gap between the inner circumference of the nut and the outer circumference of the ball-embedding nozzle over the entire circumference in the circumferential direction, and to set the gap to have the minimum dimensions that allow the balls to be supplied into the screw groove of the nut. Also, the ball pusher can push out the balls.

Advantageous Effects of Invention

In the present invention, it is possible to form a uniform gap over the entire circumference in the circumferential direction between the inner circumference of the nut and the outer circumference of the ball-embedding nozzle. Moreover, since the gap can be set to have the minimum dimensions that allow the balls to be supplied into the screw groove of the nut, the balls enter the uniform gap over the entire circumference in the circumferential direction. Therefore, swing motion of the nut is not hindered, no ball is supplied into a location other than the circulation line, and the balls can be incorporated (assembled) stably. Moreover, the ball receiving portion, that is, the upper end portion, of the ball falling prevention member can be brought close to the screw groove into which the balls are supplied. Thus, it is possible to prevent the balls supplied into the nut from falling, and to efficiently incorporate the balls more stably.

DESCRIPTION OF EMBODIMENTS

Figure 1:
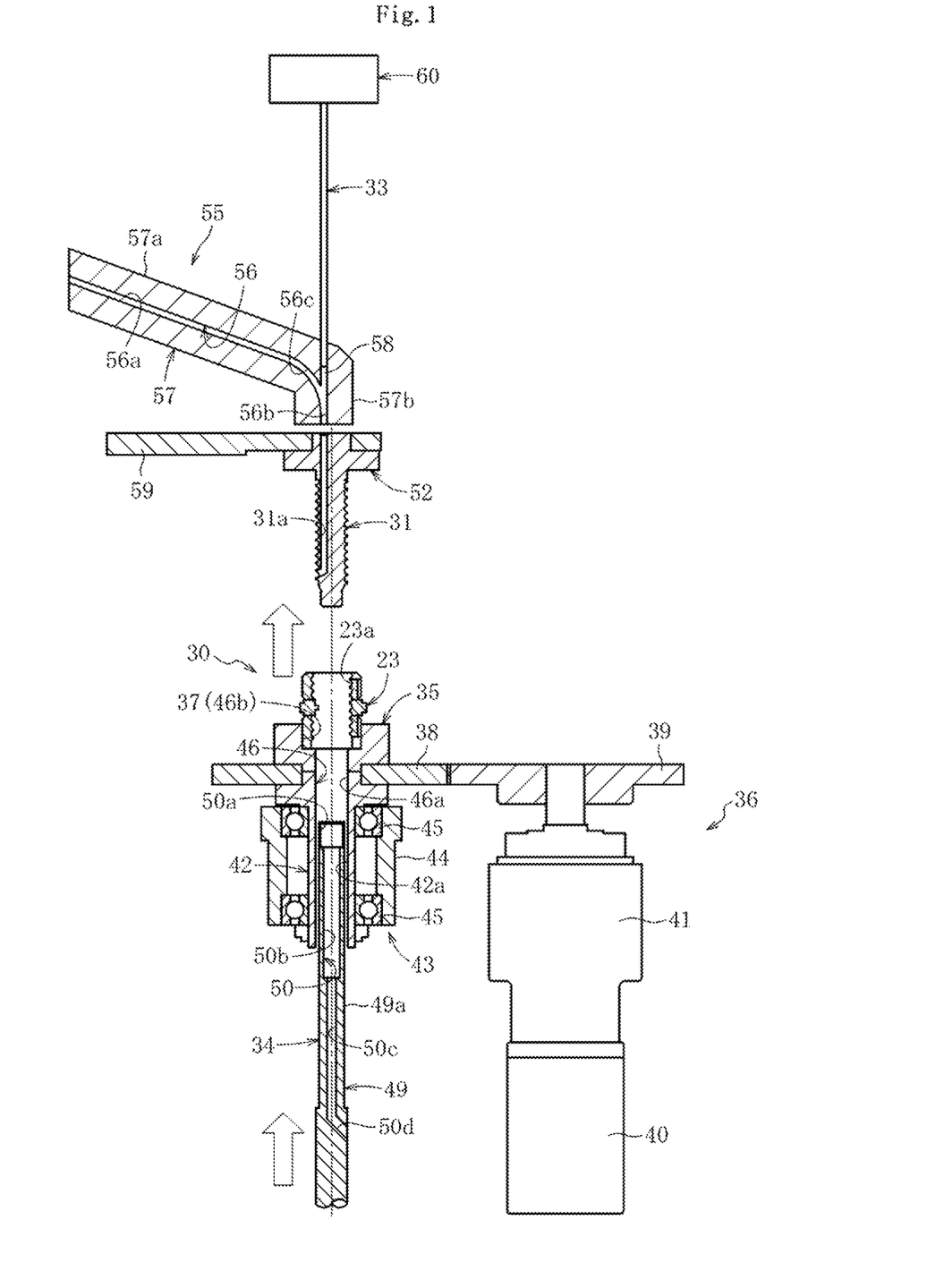
FIG. 1 is a cross-sectional view of an assembly device of a ball screw according to the present invention in a state before balls are incorporated.
Figure 2:
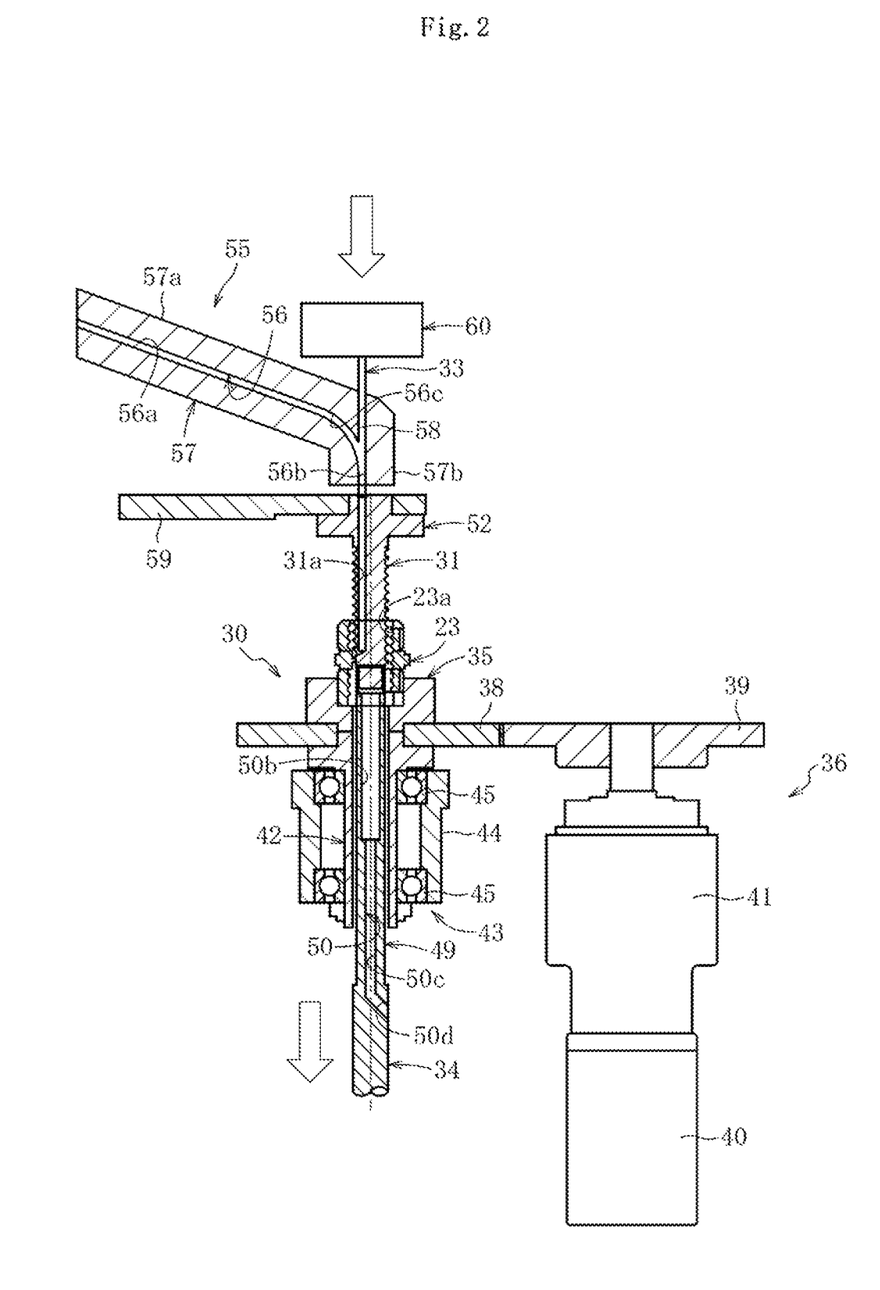
FIG. 2 is a cross-sectional view of the assembly device of the ball screw according to the present invention in a state where balls are incorporated.

Hereinafter, an embodiment of the present invention will be described below with reference to FIGS. 1 to 8. FIGS. 1 and 2 illustrate an assembly device of a ball screw according to the present invention. The assembly device of the ball screw is configured to assemble the ball screw as illustrated in FIG. 4. The ball screw includes: a screw shaft 22 having a spiral screw groove 22a formed in an outer peripheral surface of the screw shaft 22; a nut 23 which is fitted over the screw shaft 22 and having a spiral screw groove 23a formed in an inner peripheral surface of the nut 23; a large number of balls 24 which are accommodated in a rolling path formed of the screw grooves 22a, 23a facing each other; and two or more internal-deflector members 25 which serve as members for circulating these balls 24.

Figure 4:
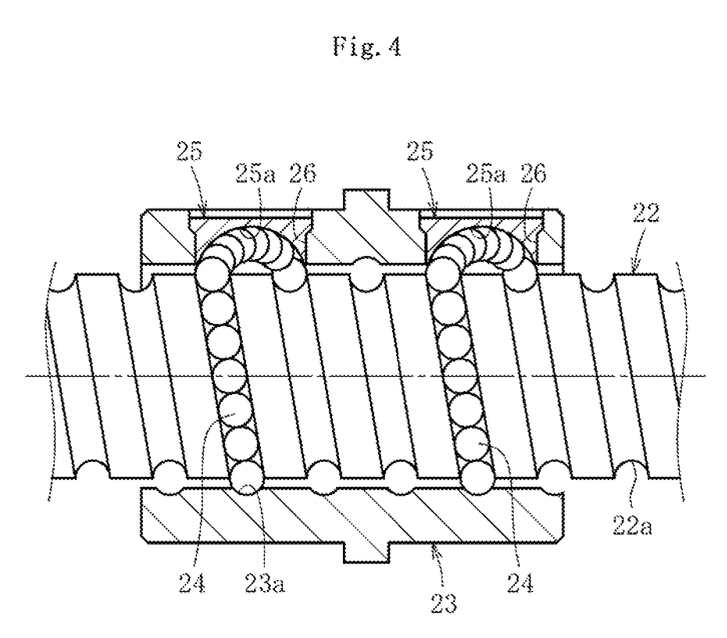
FIG. 4 is a cross-sectional view of an internal deflector-type ball screw.
Figure 5:
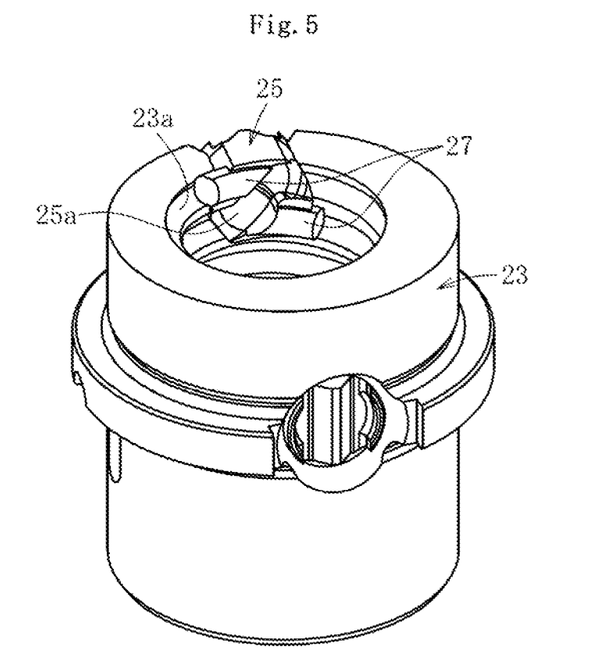
FIG. 5 is a perspective view illustrating a relationship between a nut and an internal-deflector member.

In a barrel portion of the nut 23 having a cylindrical shape, two internal-deflector windows 26 each having a substantially circular cross section are formed side by side so as to penetrate through the inner and outer peripheral surfaces of the barrel portion and to cut out part of the screw groove 23a. The internal-deflector member 25 serving as a member for circulating the balls 24 is fitted in each internal-deflector window 26. As illustrated in FIG. 5, the internal-deflector member 25 has a pair of wings 27, 27. By providing the wings 27, 27, a connecting groove 25a for connecting adjacent rounds of the screw groove 23a to each other is formed. As a result, the connecting groove 25a and a portion of the screw groove 23a which constitute an approximately one round allow the ball 24 to orbit (see FIG. 4). That is, the rolling path formed by the screw grooves 22a, 23a facing each other is an orbiting path (circulation line). The large number of balls 24 interposed between the inner and outer screw grooves 22a, 23a inside the rolling path roll along the screw grooves 22a, 23a, are guided to the connecting groove 25a of the internal-deflector member 25, pass over a screw thread of the screw shaft 22, return to the adjacent screw groove 23a, and roll again along the screw grooves 22a, 23a.

The connecting groove 25a of the internal-deflector member 25 is curved in an S shape so as to smoothly connect the adjacent screw grooves 23a, 23a of the nut 23, and is smoothly connected to the screw groove 23a. In addition, as illustrated in FIG. 4, the depth of the connecting groove 25a is set to a depth such that the ball 24 can pass over the screw thread of the screw groove 22a in the screw shaft 22 in the connecting groove 25a.

As illustrated in FIGS. 1 and 2, the assembly device of the ball screw includes: nut receiving means 30 which receives the nut 23 and rotates the nut 23 about the axis thereof; a ball-embedding nozzle 31 which has a ball supply path 31a; a ball pusher 33 which is inserted into the ball supply path 31a and supplies the balls 24 (see FIG. 4 or the like) supplied into the ball supply path 31a into the screw groove 23a of the nut 23 (including the connecting move 25a); and a ball failing prevention member 34 which prevents falling of the balls 24 supplied to the nut 23.

The nut receiving means 30 includes a base 35 which holds the nut 23, and a rotation driving mechanism 36 which rotates the base 35 about the axis thereof. The base 35 is configured of a short cylindrical body having a receiving recess 37 which is provided on the upper end surface of the base 35 and in which one end portion of the nut 23 is fitted. The rotation driving mechanism 36 includes a driven gear 38 attached to the base 35, a driving gear 39 meshing with the driven gear 38, a motor (for example, a servomotor) 40 which drives the driving gear 39 to rotate about the axis thereof. The rotary driving force of the motor 40 is transmitted to the driving gear 39 via a gear head 41.

A rotary shaft 42 is suspended from the base 35, and the rotary shaft 42 is rotatably supported by a supporting mechanism 43. The supporting mechanism 43 includes a cylindrical body 44 into which the rotary shaft 42 is inserted, and bearings 45, 45 which rotatably support the rotary shaft 42 with respect to the cylindrical body 44.

Therefore, when the motor 40 is driven, the driving gear 39 rotates about the axis thereof. Due to this rotation, the driven gear 38 meshing with the driving gear 39 rotates and the base 35 rotates about the axis thereof. The base 35 has a through hole 46 communicating with a shaft hole 42a of the rotary shaft 42. The through hole 46 is configured of a main body 46a having a diameter identical to that of the shaft hole 42a, and a large-diameter opening 46b having a diameter larger than that of the main body 46a. The large-diameter opening 46b constitutes the receiving recess 37.

The ball falling prevention member 34 includes a shaft member 49 provided with an axial hole 50. The axial hole 50 has a large-diameter portion 50a formed at the upper opening, a medium-diameter portion 50b having a diameter smaller than that of the large-diameter portion 50a, a small-diameter portion 50c having a diameter smaller than that of the medium-diameter portion 50b, and an inclined opening 50d connected to the lower end of the small-diameter portion 50c. A tapered surface 48 (see FIG. 3) is formed by expanding the opening edge of the large-diameter portion 50a from a deep side to an opening side.

In a range from the large-diameter portion 50a to the small-diameter portion 50c or the like, the shaft member 49 is formed as a small-diameter shaft portion 49a whose outer diameter dimension is smaller than that of the rotary shaft 42. The small-diameter shaft portion 49a can be freely inserted to and removed from the rotary shaft 42. That is, the shaft member 49 can be moved up and down by a reciprocating mechanism, not illustrated, along the axis of the shaft member 49. From the state illustrated in FIG. 1, the small-diameter shaft portion 49a can be inserted (lifted) into the rotary shaft 42 as illustrated in FIG. 2. In contrast, from the state illustrated in FIG. 2, the small-diameter shaft portion 49a can be lowered with respect to the rotary shaft 42 as illustrated in FIG. 1. Note that as the reciprocating mechanism, an existing mechanism such as a cylinder mechanism, a ball screw mechanism, a linear guide mechanism, or the like can be used.

In addition, the nut receiving means 30 also can be moved up and down by a reciprocating mechanism, not illustrated. From the state illustrated in FIG. 1, the ball-embedding nozzle 31 is fitted into the nut 23 in the receiving recess 37 of the base 35 as illustrated in FIG. 2. The nut 23 is positioned below the ball-embedding nozzle 31 as illustrated in FIG. 2. Note that also as this reciprocating mechanism, an existing mechanism such as a cylinder mechanism, a ball screw mechanism, a linear guide mechanism, or the like can be used.

Figure 3:
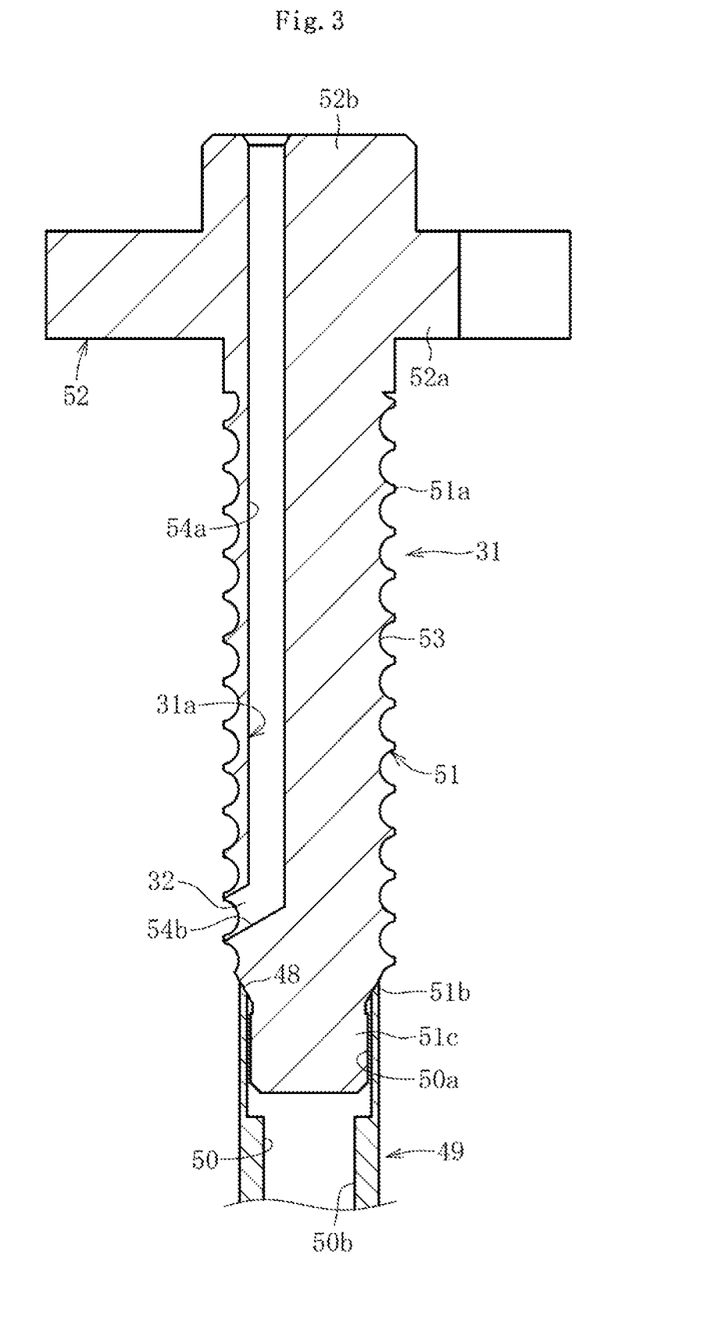
FIG. 3 is a cross-sectional view of a ball-embedding nozzle of the assembly device of the ball screw according to the present invention.

As illustrated in FIG. 3, the ball-embedding nozzle 31 includes a main body shaft portion 51, and a head portion 52 connected to the upper end of the main body shaft portion 51. The main body shaft portion 51 has a groove formed shaft 51a having a screw groove 53 formed in an outer periphery of the groove formed shaft 51a, and a leading small-diameter portion 51c connected to the leading end (lower end) of the groove formed shaft 51a via a tapered portion 51b whose diameter decreases toward the lower end. The head portion 52 includes a flange portion 52a and a disc-shaped protrusion 52b. The screw groove 53 of the main body shaft portion 51 is a spiral screw groove identical to the screw groove 22a (see FIG. 4) of the screw shaft 22 of the ball screw.

As described above, the ball supply path 31a is formed in the ball-embedding nozzle 31. In this case, the ball supply path 31a opens to the upper end surface of the head portion 52 and opens to the outer circumferential surface of the lower end portion of the groove formed shaft 51a. That is, the ball supply path 31a is configured of a linear portion 54a which is opened on the upper end surface of the head portion 52 and is disposed in parallel to the axis of the ball-embedding nozzle 31, and an inclined portion 54b which is connected to the lower end of the linear portion 54a and inclined at a predetermined angle with respect to the linear portion 54a. The lower end opening of the ball supply path 31a, that is, the opening of the inclined portion 54b, is a ball supply port 32.

In this case, as illustrated in FIGS. 1 and 2, the head portion 52 of the ball-embedding nozzle 31 fixes a nozzle holding member 59. That is, the ball-embedding nozzle 31 does not move up and down. Ball supply means 55 and the ball pusher 33 are disposed above the ball-embedding nozzle 31.

As illustrated in FIGS. 1 and 2, the ball supply means 55 has a ball supply nozzle 57 having a ball supply hole 56. The ball supply nozzle 57 includes a nozzle main body 57a which is inclined at a predetermined angle with respect to the vertical direction, and an embedding-nozzle facing portion 57b which is connected to the lower portion of the nozzle main body 57a and faces the ball-embedding nozzle 31. Therefore, the ball supply hole 56 is configured of an inclined portion 36a disposed along the axis of the nozzle main body 57a, a vertical portion 56b disposed along the axis of the embedding-nozzle facing portion 57b, and a curved portion 56c connecting the inclined portion 56a and the vertical portion 56b.

A ball-pusher fitting hole 58 joined to the vertical portion 56b is provided in the embedding-nozzle facing portion 57b. The hole diameter of the ball-pusher fitting hole 58 is set to be identical to the hole diameter of the ball supply path 31a of the ball-embedding nozzle 31. The axis of the ball-pusher fitting hole 58 and the axis of the ball supply path 31a of the ball-embedding nozzle 31 are arranged on an identical vertical axis.

The outer diameter dimension of the ball pusher 33 is set to be slightly smaller than the hole diameter of the ball-pusher fitting hole 58 and the hole diameter of the ball supply path 31a of the ball-embedding nozzle 31. Therefore, the ball pusher 33 can be inserted into and reciprocate in the ball-pusher fitting hole 58 and the ball supply path 31a. The length dimension of the ball pusher 33 is set such that when the ball pusher 33 is inserted into the ball-pusher fitting hole 58 and the ball supply path 31a as illustrated in FIG. 2, the leading end of the ball pusher 33 can reach the inclined portion 54b (see FIG. 3) of the ball supply path 31a. Note that as illustrated in FIGS. 1 and 2, the ball pusher 33 is suspended from a holding member 60 and can reciprocate in the axial direction of the ball pusher 33 via a reciprocating mechanism, not illustrated. As the reciprocating mechanism, an existing mechanism such as a cylinder mechanism, a ball, screw mechanism, a linear guide mechanism, or the like can be used.

Next, a method of assembling the ball screw using the assembly device of the ball screw configured as described above will be described. First, as illustrated in FIG. 1, one end portion of the nut 23 is fitted in the receiving recess 37 of the base 35 of the nut, receiving means 30. In this case, the ball pusher 33, the ball-pusher fitting hole 58, the ball supply path 31a, the nut 23, the base 35, the shaft member 49, and the like are disposed on an identical vertical line.

Figure 6:
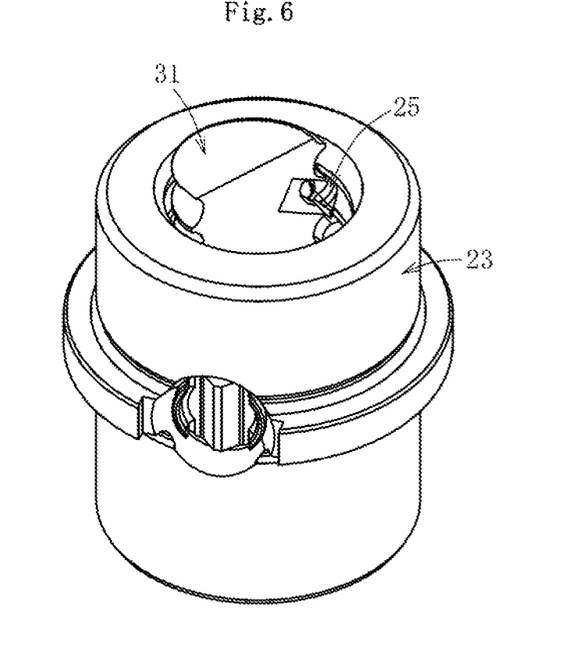
FIG. 6 is a perspective view illustrating a relationship among the nut, the internal-deflector member, and the ball-embedding nozzle.

In this state, by driving the rotation driving mechanism 36, the nut receiving means 30 is lifted while the nut 23 is rotated about the axis thereof. As illustrated in FIGS. 2 and 6, the lower portion of the ball-embedding nozzle 31 is fitted into the nut 23. At this time, the shaft member 49 of the ball falling prevention member 34 is also lifted.

In the state illustrated in FIG. 2 (in a state where the nut 23 is received by the nut receiving means 30, the wings 27, 27 of the internal-deflector member 25 are fitted in the screw groove 53 in the outer circumferential surface of the ball-embedding nozzle 31, and the ball-embedding nozzle 31 is fitted into the nut such that a gap which is uniform over the entire circumference is formed between the inner circumference of the nut 23 and the outer circumference of the ball-embedding nozzle 31), the balls 24 (see FIG. 4) are supplied into the ball supply hole 56 of the ball supply nozzle 57 and then are supplied into the ball supply path 31a of the ball-embedding nozzle 31. Thus, the balls 24 are supplied from the opening of the inclined portion 54b of the ball supply path 31a to the lowermost circulation line of the screw groove 23a of the nut 23.

Then, by driving the rotation driving mechanism 36 to swing the base 35 about the axis thereof, a space not filled with the ball 24 can be sequentially generated in the screw groove raceway of the nut 23, and the space can be sequentially filled with the ball 24. When the ball 24 is filled into the screw groove 23a, the ball 24 can be pushed into the screw groove 23a by lowering the ball pusher 33.

Figure 7A:
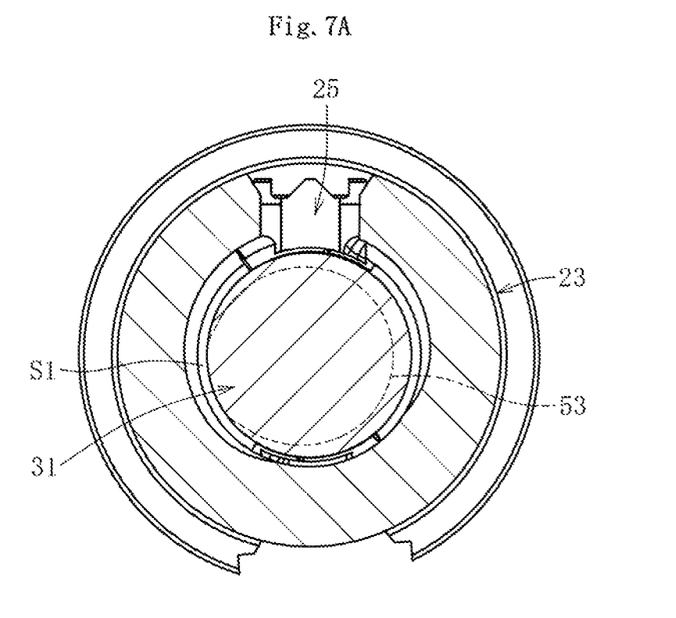
FIG. 7A is a cross-sectional view illustrating the relationship among the nut, the internal-deflector member, and the ball-embedding nozzle.
Figure 7B:
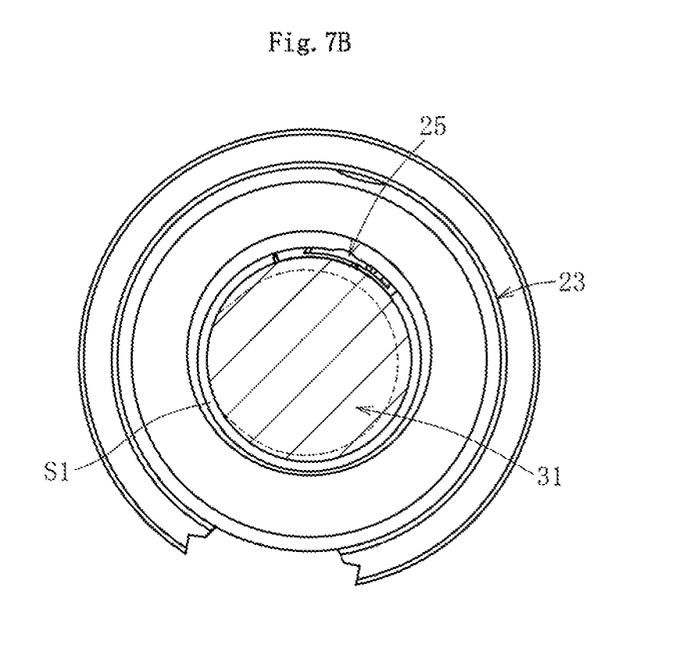
FIG. 7B is a plan view illustrating the relationship among the nut, the internal-deflector member, and the ball-embedding nozzle.

In this assembly device of the ball screw, since the spiral screw groove 53 identical to the screw groove 22a (see FIG. 4) of the screw shaft 22 is provided in the outer circumferential surface of the ball-embedding nozzle 31, it is possible to form a uniform gap S1 between the inner circumference of the nut and the outer circumference of the ball-embedding nozzle over the entire circumference in the circumferential direction as illustrated in FIG. 7A. Even when the nut 23 swings about the axis thereof, it is possible to keep the gap S1 uniform over the entire circumference in the circumferential direction as illustrated in FIG. 7B. Moreover, the gap S1 can be set to have the minimum dimensions that allow the balls 24 to be supplied into the screw groove 23a (see FIG. 4) of the nut 23.

Therefore, the balls 24 enter the gap S1, which is uniform over the entire circumference in the circumferential direction. As a result, swing motion of the nut 23 is not hindered, no ball 24 is supplied into a location other than the circulation line, and the balls 24 can be incorporated (assembled) stably. Moreover, the ball pusher 33 can stably push out the balls 24.

The ball receiving portion, that is, the upper end portion, of the ball falling prevention member 34 can be brought close to the screw groove 53 to which the balls 24 are supplied. Thus, it is possible to prevent the balls 24 supplied into the nut 23 horn falling, and to efficiently incorporate the balls 24 more stably.

Figure 8:
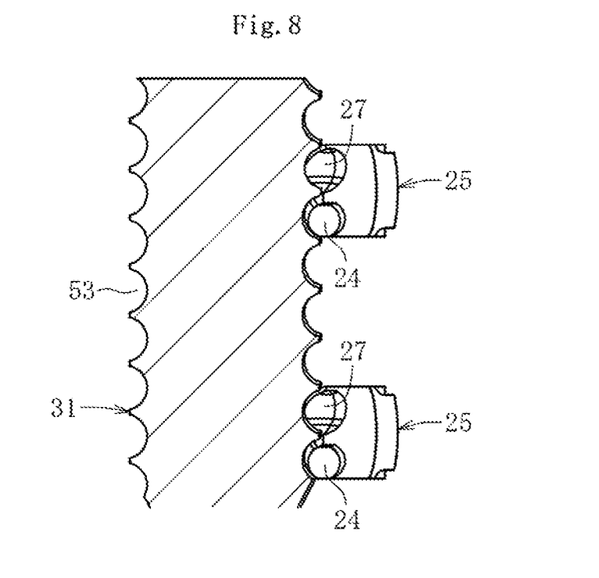
FIG. 8 is a cross-sectional view illustrating a relationship between the ball-embedding nozzle and the internal-deflector member.

As illustrated in FIG. 8, the relationship between the ball-embedding nozzle 31 and the internal-deflector member 25 is such that the wings 27, 27 of the internal-deflector member 25 are fitted in (enter) valleys of the screw groove 23a. Therefore, the internal-deflector member 25 does not interfere with ball incorporating operation.

As illustrated in FIGS. 1 and 2, the nut receiving means 30 includes the base 35 which holds the nut 23 and the rotation driving mechanism 36 which rotates the base 35 about the axis thereof. Therefore, the nut 23 can be stably rotated about the axis thereof.

Each of the nut receiving mean 30 and the ball falling prevention member 34 can be set so as to be able to move up and down. By setting the nut receiving means 30 and the ball falling prevention member 34 as described above, assuming that the state where the nut receiving means 30 and the ball falling prevention member 34 are disposed below the ball-embedding nozzle 31 is an initial state, the ball-embedding nozzle 31 can be fitted into the nut 23 received by the nut receiving means 30 from above and the ball falling prevention member 34 can be fitted into the nut 23 from below by lifting the nut receiving means 30 and the ball falling prevention member 34. In addition, by further lifting the nut receiving means 30 while rotating the nut 23 about the axis thereof in a state where the ball-embedding nozzle 31 is fitted into the nut 28 from above, it is possible to make the lower opening of the ball supply path 31a match the screw groove 23a of the nut 23.

Therefore, it is possible to stably and efficiently perform operation of incorporating the balls 24 into the screw groove 23a of the nut 23, which results in excellent productivity.

Although the embodiment of the present invention has been described above, the present invention is not limited to the above-described embodiment, and various modifications are possible. In the above embodiment, nut receiving means 30 side is moved up and down; however, a ball-embedding nozzle 31 side may be moved up and down, or both the nut receiving means 30 side and the ball-embedding nozzle 31 side may be moved up and down. The number of internal-deflector members 25 of the ball screw may be any. In addition, it is preferable that a ball pressing portion, that is, the lower edge, of the ball pusher 33 has a spherical shape.

INDUSTRIAL APPLICABILITY

A ball screw assembled by the assembly device of the ball screw and the assembly method of the ball screw according to the present invention is used for conveying, positioning, or the like of a semiconductor manufacturing device, an industrial robot, or a machine tool.

REFERENCE SIGNS LIST

22: Screw shaft
22a: Screw groove
23: Nut
23a: Screw groove
24: Ball
25: Internal-deflector member
30: Nut receiving means
31: Ball-embedding nozzle
31a: Ball supply path
32: Ball supply port
33: Ball pusher
34: Ball falling prevention member
35: Base
36: Rotation driving mechanism
53: Screw groove
54a: Linear portion
54b: Inclined portion

The invention claimed is:

1. An assembly device of a ball screw including a screw shaft having a spiral screw groove formed in an outer peripheral surface of the screw shaft, a nut which is fitted over the screw shaft and having a spiral screw groove formed in an inner peripheral surface of the nut, a plurality of balls which is accommodated in a rolling path formed of both spiral screw grooves facing each other, and an internal-deflector member which serves as a member for circulating the plurality of balls, the assembly device comprising:
   nut receiving means which receives the nut and rotates the nut about an axis of the nut;
   a ball-embedding nozzle which has a ball supply path;
   a ball pusher which is inserted into the ball supply path and pushes the plurality of balls supplied into the ball supply path into a screw groove of the nut; and
   a ball falling prevention member which is fitted into the nut from a lower opening of the nut to prevent falling of the plurality of balls supplied into the nut,
   wherein a spiral screw groove identical to the spiral screw groove of the screw shaft is provided in an outer circumferential surface of the ball-embedding nozzle.

2. The assembly device of the ball screw according to claim 1, wherein the ball supply path is configured of a linear portion which is disposed in parallel to an axis of the ball-embedding nozzle, and an inclined portion which is connected to a lower end of the linear portion and is inclined at a predetermined angle with respect to the linear portion, and wherein a lower end opening of the inclined portion serves as a ball supply port to the screw groove of the nut.

3. The assembly device of the ball screw according to claim 1, wherein the nut receiving means includes a base which holds the nut, and a rotation driving mechanism which rotates the base about an axis of the base.

4. The assembly device of the ball screw according to claim 1, wherein each of the nut receiving means and the ball falling prevention member is movable up and down.

5. An assembly method of a ball screw using the assembly device of the ball screw according to claim 1 comprising:
   fitting the ball-embedding nozzle into the nut such that a gap which is uniform over an entire circumference is formed between an inner circumference of the nut and an outer circumference of the ball-embedding nozzle in a state where the nut is received by the nut receiving means and a wing of the internal-deflector member is fitted in the spiral screw groove in the outer circumferential surface of the ball-embedding nozzle; and
   supplying the plurality of balls to the screw groove of the nut via the ball supply path of the ball-embedding nozzle.

6. The assembly device of the ball screw according to claim 2, wherein the nut receiving means includes a base which holds the nut, and a rotation driving mechanism which rotates the base about an axis of the base.

7. The assembly device of the ball screw according to claim 2, wherein each of the nut receiving means and the ball falling prevention member is movable up and down.

8. The assembly device of the ball screw according to claim 3, wherein each of the nut receiving means and the ball falling prevention member is movable up and down.

9. An assembly method of a ball screw using the assembly device of the ball screw according to claim 2 comprising:
   fitting the ball-embedding nozzle into the nut such that a gap which is uniform over an entire circumference is formed between an inner circumference of the nut and an outer circumference of the ball-embedding nozzle in a state where the nut is received by the nut receiving means and a wing of the internal-deflector member is fitted in the spiral screw groove in the outer circumferential surface of the ball-embedding nozzle; and
   supplying the plurality of balls to the screw groove of the nut via the ball supply path of the ball-embedding nozzle.

10. An assembly method of a ball screw using the assembly device of the ball screw according to claim 3 comprising:
    fitting the ball-embedding nozzle into the nut such that a gap which is uniform over an entire circumference is formed between an inner circumference of the nut and an outer circumference of the ball-embedding nozzle in a state where the nut is received by the nut receiving means and a wing of the internal-deflector member is fitted in the spiral screw groove in the outer circumferential surface of the ball-embedding nozzle; and
    supplying the plurality of balls to the screw groove of the nut via the ball supply path of the ball-embedding nozzle.

11. An assembly method of a ball screw using the assembly device of the ball screw according to claim 4 comprising:
    fitting the ball-embedding nozzle into the nut such that a gap which is uniform over an entire circumference is formed between an inner circumference of the nut and an outer circumference of the ball-embedding nozzle in a state where the nut is received by the nut receiving means and a wing of the internal-deflector member is fitted in the spiral screw groove in the outer circumferential surface of the ball-embedding nozzle; and
    supplying the plurality of balls to the screw groove of the nut via the ball supply path of the ball-embedding nozzle.

* * * * *